Jan. 12, 1965  R. A. SCHEIDT  3,165,450
ANAEROBIC CULTURING DEVICE
Filed March 11, 1963

INVENTOR.
ROBERT A. SCHEIDT
BY
Lieber & Niller
ATTORNEYS 3,165,450
ANAEROBIC CULTURING DEVICE
Robert A. Scheidt, Hales Corners, Wis., assignor to St. Luke's Hospital Research Foundation, Inc., Milwaukee, Wis., a corporation of Wisconsin
Filed Mar. 11, 1963, Ser. No. 264,449
6 Claims. (Cl. 195—139)

The present invention relates generally to improvements in the art of microbiological culturing, and relates more particularly to improvements in anaerobic culturing technics.

In most clinical laboratories, anaerobic culture methods have been dependent upon technics which tend to discourage their routine use, and such methods have accordingly been neglected more often than most microbiological technics. While the problems associated with anaerobic culture in fluid media have been overcome to a considerable extent by relatively simple methods, such as those employing thioglycollate as a reducing agent, the disadvantages have not been adequately resolved for anaerobic methods wherein solid media are to be employed; and existing anaerobic plating technics are cumbersome and poorly suited to routine use wherein rapid and easy processing of numerous and varied clinical specimens is essential. This is especially true under the frequent circumstances which necessitate the preparation of only a few or even a single agar plate for anaerobic culture.

Heretofore, it was common practice to prepare a multiple-plate anaerobic jar to process a number of specimens, but such technic resulted in harmful delays and various other disadvantages. More recently, methods for preparation of a single agar plate for anaerobic culture have been devised. In the most acceptable method, a sealed micro-diffusion dish of the Conway type is employed, the central well of the disposable micro-diffusion dish being supplied with the solid medium by sterile technic and the other well of the dish being provided with a dry mixture of pyrogallic acid ($C_6H_3(OH)_2$) and anhydrous sodium carbonate ($Na_2CO_3$). The dish is then sealed and the oxygen concentration therein is reduced by the reaction of the pyrogallic acid and sodium carbonate to induce culturing of the anaerobic microorganism.

While such use of a Conway type micro-diffusion dish obtainable as a pre-sterilized, disposable unit has eliminated some of the previous disadvantages attendant the use of an anaerobic jar for processing the specimens, there are still several disadvantages present. For example, the containment of spreading organisms and the effective separation of the anaerobic media or specimen from the substances employed for removal of oxygen and carbon monoxide from the atmosphere within the sealed container is still difficult. Also, the confinement of the anaerobic specimen within a well spaced laterally of and segregated by an upright partition from the well which receives the chemical mixture for creating reduced oxygen concentration sometimes results in delays in producing the proper anaerobic environment and causes injurious results in inhibiting organisms. Furthermore, the micro-diffusion dishes employed in such methods require rather careful handling in confined side-by-side areas due to the disposition of the wells which receive the anaerobic media and the chemical mixture for producing anaerobiasis.

It is therefore an important object of the present invention to provide an improved device for use in anaerobic culturing which obviates the aforementioned disadvantages attendant prior devices intended for similar purposes.

Another object of the present invention is to provide an improved anaerobic culturing device which employs a commercially available Petri dish and a readily fabricated perforated plate and dome-shaped cover cooperating to form an upper segregated compartment for receiving the anaerobic plate or plates containing specimens to be cultured.

Still another object of the invention is to provide an improved disposable micro-diffusion dish for anaerobic culturing which is extremely simple, inexpensive and easy to handle and wherein the proper anaerobic environment is produced in an extremely rapid and highly efficient manner.

An additional object of the present invention is to provide an improved disposable anaerobic culturing device having several segregated lower compartments for receiving substances adapted for the treatment of the atmosphere within the container by chemical reaction in order to create conditions conducive to anaerobic growth, and an upper compartment open to the lower compartments but segregated therefrom for supporting an anaerobic plate or plates to be cultured.

These and other additional objects and advantages of the invention will become apparent from the following detailed description.

A clear conception of the features constituting the present invention and of the mode of constructing and utilizing anaerobic culturing devices embodying the improvements may be had by referring to the drawing accompanying and forming a part of this specification, wherein like reference characters designated the same or similar parts in the several views.

Figure 1:
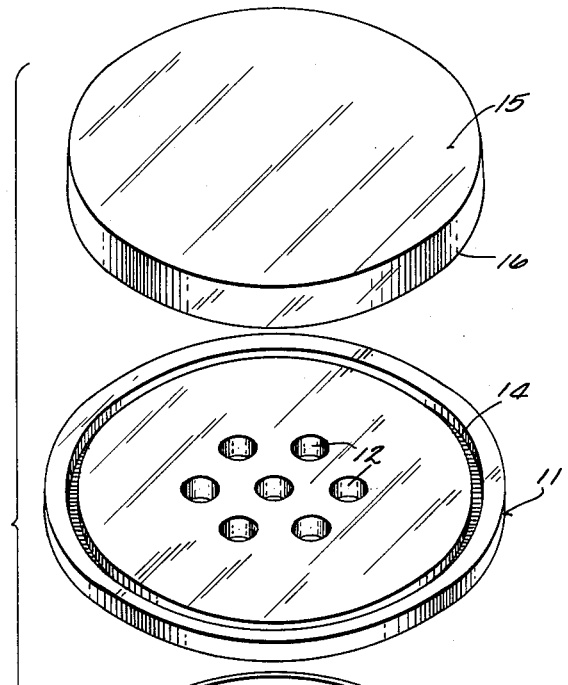
FIG. 1 is an exploded perspective view of a typical anaerobic culturing device embodying the invention, the view being taken from the side and top of the several parts.

While the invention has been shown and described herein as being particularly adapted for use with a dish, in the nature of a Petri dish, of cylindrical form and having transverse walls forming a given number of segmental compartments, it is not desired or intended to thus restrict the scope or utility of the improvements by reason of such specific embodiment since the container and the partitioned compartments in the lower portion thereof may be of various shapes, sizes and number without departing from the invention; and it is also contemplated that certain specific descriptive terminology used herein shall be given the broadest possible interpretation consistent with the disclosure.

Referring to the drawing, the anaerobic culturing device shown therein as embodying the invention comprises, in general, a shallow dish 7 having a continuous upstanding side wall 8 and a number of transverse partitions 9 therein forming segregated chambers 10, a flat plate 11 having a number of perforations 12 therein surrounded by continuous open grooves 13, 14 formed in its opposite side faces, and a cover 15 having a continuous lip 16 depending therefrom.

Figure 2:
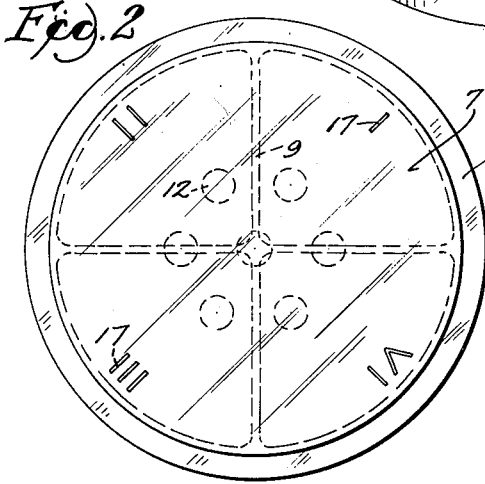
FIG. 2 is a bottom view of the assembled culturing device of FIG. 1.
Figure 3:
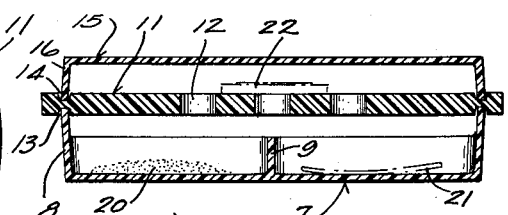
FIG. 3 is a transverse vertical section through the assembled device.

The dish 7, plate 11, and cover 15 may all be readily fabricated of a suitable plastic in accordance with known production methods, and all of these parts are preferably transparent to permit observation of the culturing process. As a matter of fact, the cylindrical shaped dish 7 shown in the drawing is of a type commercially available and referred to as a Petri dish, the cover 15 being likewise commercially vailable for use in conjunction with the dish. As illustrated, the groove 13 in the one face of the perforated plate 11 is contoured for reception on the upper peripheral edge of the wall 8 of the dish 7, and the groove 14 is contoured to receive the lower edge of the depending lip 16 of the cover 15. Also, as a matter of convenience, the several compartments 10 of the dish 7 may be identified by number as indicated by the numeral 17 in FIG. 2, but this numbering of the compartments is only a matter of convenience.

Figure 4:
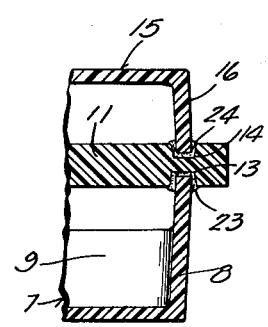
FIG. 4 is a somewhat enlarged fragmentary sectional view of the sealed edge portion thereof.

In use, anhydrous sodium carbonate ($Na_2CO_3$) and pyrogallic acid ($C_6H_3(OH)_2$) in the amount of approximately 2 to 4 grams each are mixed in one of the compartments 10 in the dish 7, as shown in phantom at 20, and a piece of filter paper soaked in 0.2 N palladium chloride in 0.001 N hydrochloric acid is placed in another of the compartments 10, as illustrated in phantom at 21. The perforated partition plate 11 is then assembled in position on the dish 7, the groove 13 being supplied with a suitable sealant such as a semisolid petroleum dispensed within the groove as illustrated at 23 in FIG. 4 by means of a syringe or the like prior to application of the plate to the dish. The plate 22 containing the anaerobic medium to be cultured is then placed upon the perforated partition, and with the upper groove 14 likewise filled with a suitable sealant as at 24, the cover 15 is finally applied. A suitable semisolid petroleum sealant for filling the grooves 13, 14 consists of a three to one mixture of jelly and liquid petroleum commercially available from Standard Oil Company under the name Stanolind Petrolatum, and such sealant possesses sufficient viscosity to maintain the seal at usual incubator temperatures.

With the container thus assembled, the mixture 20 of pyrogallic acid ($C_6H_3(OH)_2$) and anhydrous sodium carbonate ($Na_2CO_3$) reacts in accordance with the so-called alkaline pyrogallol method to remove oxygen from the atmosphere within the container; and the carbon monoxide which is an undesirable by-product of such reaction is removed from the atmosphere by the filter paper 21 soaked with 0.2 N palladium chloride and 0.001 N hydrochloric acid. It is apparent that the oxygen concentration is thus reduced throughout the entire container by reason of the open areas between the compartment forming walls 9 and the lower face of the plate 11 and the perforations 12 in the plate which supports the specimen 22 being cultured. In extensive tests, a variety of anaerobic microorganisms of varying fastidiousness have been successfully cultured by this method, and the modified technic described herein greatly facilitates the making of routine anaerobic cultures. Some examples of various microorganisms successfully cultured in these tests are Bacteroides sp., *Clostridium bolulinum, Clostridium felsineum, Clostridium perfringens, Clostridium tetani, Peptostreptococcus anaerobius.*

Various modes of carrying out the invention are contemplated as being within the scope of the following claims particularly pointing out and distinctly claiming the subject matter which is regarded as the invention.

I claim:

1. An anaerobic culturing device comprising, a shallow dish having a continuous upstanding side wall and provided with partitions forming laterally disposed segregated chambers for receiving substances for the treatment of the atmosphere by chemical reaction to create conditions conducive to anaerobic growth, a perforated plate having a continuous open groove on each of its opposite faces with one of said grooves being received by and seated upon the peripheral upper edge of the dish side wall, said plate thus presenting an open platform spanning said dish with said perforations establishing communication between all of said segregated chambers and the atmosphere above said platform, a culture plate for receiving an anaerobic specimen to be cultured seated upon said platform, and an imperforate cover having a continuous depending lip received by and seated within the other of said grooves to provide an upper compartment, said cover and said dish cooperating to provide a sealed receptacle having an upper compartment and segregated lower chambers, said culture plate being of such size and shape and so positioned on said perforated platform as to allow for free circulation throughout the entire interior of said receptacle.

2. An anaerobic culturing device according to claim 1, wherein the dish and cover are cylindrical and the perforated plate is disk-shaped with the grooves in the opposite faces thereof being annular.

3. An anaerobic cluturing device according to claim 1, wherein the partitions in the dish terminate below the peripheral upper edge of the dish side wall and the perforated plate spanning the dish is spaced from the upper edges of the partitions.

4. An anaerobic culturing device according to claim 1, wherein the perforated plate is provided with at least one perforation for each of the segregated lower chambers.

5. An anaerobic culturing device according to claim 1, wherein the perforated plate is formed of transparent plastic and is disposable.

6. An anaerobic culturing device according to claim 1, wherein the grooves formed in the perforated plate are supplied with a sealant.

References Cited in the file of this patent

UNITED STATES PATENTS

| | | |
|---|---|---|
| 2,533,089 | Brewer et al. | Dec. 5, 1950 |
| 2,677,646 | Lovell et al. | May 4, 1954 |
| 2,874,091 | Fisk | Feb. 17, 1959 |
| 3,001,914 | Andersen | Sept. 26, 1961 |
| 3,055,808 | Henderson | Sept. 25, 1962 |